United States Patent
S Bykampadi et al.

(10) Patent No.: US 11,652,851 B2
(45) Date of Patent: May 16, 2023

(54) METHOD AND APPARATUS FOR NETWORK FUNCTION MESSAGING

(71) Applicant: Nokia Technologies Oy, Espoo (FI)

(72) Inventors: Nagendra S Bykampadi, Bangalore (IN); Uwe Rauschenbach, Munich (DE)

(73) Assignee: Nokia Technologies Oy, Espoo (FI)

(*) Notice: Subject to any disclaimer, the term of this patent is extended or adjusted under 35 U.S.C. 154(b) by 108 days.

(21) Appl. No.: 17/044,347

(22) PCT Filed: Apr. 2, 2019

(86) PCT No.: PCT/FI2019/050263
§ 371 (c)(1),
(2) Date: Oct. 1, 2020

(87) PCT Pub. No.: WO2019/193252
PCT Pub. Date: Oct. 10, 2019

(65) Prior Publication Data
US 2021/0029177 A1 Jan. 28, 2021

(30) Foreign Application Priority Data
Apr. 6, 2018 (IN) .............................. 201811013244

(51) Int. Cl.
*H04L 9/40* (2022.01)
*H04W 12/106* (2021.01)
(Continued)

(52) U.S. Cl.
CPC ........ *H04L 63/205* (2013.01); *H04L 63/0428* (2013.01); *H04L 63/123* (2013.01);
(Continued)

(58) Field of Classification Search
CPC . H04L 63/205; H04L 63/0428; H04L 63/123; H04W 12/03; H04W 12/06; H04W 12/106
(Continued)

(56) References Cited

U.S. PATENT DOCUMENTS 7,181,012 B2* 2/2007 Arkko .................... H04W 12/06
380/246
2006/0123226 A1* 6/2006 Kumar ................ H04L 63/0281
713/154
(Continued)

FOREIGN PATENT DOCUMENTS

WO 2017/200978 A1 11/2017

OTHER PUBLICATIONS

Living Document: Security of Service Based Architecture of 5G phase 1, 3GPP TSG SA WG3 (Security) Meeting '90bis, S3-180888, Agenda : 4.1.13.5, China Mobile, Feb. 26-Mar. 2, 2018, 18 pages.*
(Continued)

*Primary Examiner* — Dant B Shaifer Harriman
(74) *Attorney, Agent, or Firm* — Harrington & Smith (57) ABSTRACT

A sending security edge proxy SEPP receives a first message sent by a first network function to a second network function. The first message has a plurality of first message parts including: a request line or a response line; at least one header; and payload. Second message parts are formed from the features and optional sub-features of the first message parts. A security structure defines a required security measure individually for each second message part. The SEPP applies, according to the security structure definition, to each second message part by encrypting; integrity protecting; or modification tracking with integrity protecting; and forms a second message that contains the second message parts; and sends the second message towards the second network
(Continued)

function. Corresponding methods, structures, computer programs and a system are disclosed for intermediate nodes and receiving SEPP.

14 Claims, 5 Drawing Sheets

(51) Int. Cl.
    *H04W 12/03*     (2021.01)
    *H04W 12/06*     (2021.01)
    *H04W 84/04*     (2009.01)

(52) U.S. Cl.
    CPC ........... *H04W 12/03* (2021.01); *H04W 12/06* (2013.01); *H04W 12/106* (2021.01); *H04W 84/042* (2013.01)

(58) Field of Classification Search
    USPC .......................................................... 726/26
    See application file for complete search history.

(56) References Cited

U.S. PATENT DOCUMENTS

| | | | |
|---|---|---|---|
| 2010/0067698 A1* | 3/2010 | Hahn | H04L 63/123 380/270 |
| 2011/0208867 A1* | 8/2011 | Anthias | G06F 9/546 709/227 |
| 2014/0032690 A1* | 1/2014 | Ramarao | H04L 51/00 709/206 |
| 2016/0050562 A1 | 2/2016 | Pudney et al. | |
| 2016/0127897 A1 | 5/2016 | Lee et al. | |
| 2017/0111328 A1* | 4/2017 | Leon | H04L 9/14 |

OTHER PUBLICATIONS

Extended European Search Report received for corresponding European Patent Application No. 19781410.6, dated Nov. 30, 2021, 8 pages.
"3rd Generation Partnership Project; Technical Specification Group Services and System Aspects; Security architecture and procedures for 5G system (Release 15)", 3GPP TS 33.501, V1.0 0, Mar. 2018, pp. 1-128.
Heer et al., "ALPHA: An Adaptive and Lightweight Protocol for Hop-by-hop Authentication", Proceedings of the 2008 ACM CoNEXT Conference, Dec. 2008, 12 pages.
"Integrity Protection for SBA over N32", 3GPP TSG SA WG3 (Security) Meeting #90bis, S3-180898, Agenda : 4.1.13.2, NTT DOCOMO, Feb. 26-Mar. 2, 2018, 4 pages.
Jones et al., "JSON Web Encryption (JWE)", RFC 7516, Internet Engineering Task Force (IETF), May 2015, pp. 1-51.
Jones et al., "JSON Web Signature (JWS)", RFC 7515, Internet Engineering Task Force (IETF), May 2015, pp. 1-59.
Bryan et al., "JavaScript Object Notation (JSON) Patch", RFC 6902, Internet Engineering Task Force (IETF), Apr. 2013, pp. 1-18.
Hoffman et al., "JSON Merge Patch", RFC 7386, Internet Engineering Task Force (IETF), Oct. 2014, pp. 1-9.
"3rd Generation Partnership Project Technical Specification Group Services and System Aspects;Security architecture and procedures for 5G system(Release 15)", 3GPP TS 33.501, V15.0.0, Mar. 2018, pp. 1-128.
Miller, Examples of Protecting Content Using JSON Object Signing and Encryption (JOSE), RFC 7520, Internet Engineering Task Force (IETF), May 2015, pp. 1-120.
International Search Report and Written Opinion received for corresponding Patent Cooperation Treaty Application No. PCT/FI2019/050263, dated Jun. 13, 2019, 16 pages.
Ahmad et al., "5G Security: Analysis of Threats and Solutions", IEEE Conference on Standards for Communications and Networking (CSCN), 2017, pp. 193-199.

* cited by examiner

METHOD AND APPARATUS FOR NETWORK FUNCTION MESSAGING

RELATED APPLICATION

This application claims priority to PCT Application No., PCT/FI2019/050263 filed on Apr. 2, 2019, which claims priority to India Application No. 201811013244, filed on Apr. 6, 2018, each of which is incorporated herein by reference in its entirety.

TECHNICAL FIELD

Various example embodiments relate to network function messaging.

BACKGROUND

This section illustrates useful background information without admission of any technique described herein representative of the state of the art.

In 5G, a service based architecture is introduced to model services as network functions (NFs) that communicate with each other using RESTful APIs. In the scenario where the two communicating NFs are in two different PLMNs, communication happens over a roaming interface between the two participating PLMNs.

To protect NF specific content in the messages that are sent over the roaming interface, each 5G PLMN has a Security Edge Proxy (SEPP) as the entity sitting at the perimeter of the PLMN network and acting as a gateway that protects all the traffic going out of the network. The SEPP implements application layer security for data exchanged between two inter-network NFs at the service layer.

Application layer security involves protecting information sent in various parts of the HTTP message, including HTTP Request/Response Line, HTTP header and HTTP Payload. However, some parts of this message may need to be modified by the intermediaries (IPX providers) between the two SEPPs.

SUMMARY

Various aspects of examples of are set out in the claims.

According to a first example aspect, there is provided an apparatus;

wherein the apparatus is a security edge proxy comprising:

an input for receiving a first message that has been sent by a first network function and addressed to a second network function;

the first message comprising a plurality of first message parts comprising: a request line or a response line; at least one header; and payload, each including one or more features and optional sub-features;

a processor configured to cause:

obtaining a security structure definition that defines a required security measure for each feature and optional sub-feature;

forming second message parts from the features and sub-features of the first message parts;

applying, according to the security structure definition, to each second message part encrypting; integrity protecting; or modification tracking with integrity protecting;

forming a second message that contains the second message parts; and sending the second message towards the second network function.

The modification tracking with integrity protecting may allow modification by another entity while enabling detecting what was modified and which entity has performed the modification.

The forming of the second message parts from the features and optional sub-features of the first message parts may be performed according to the security structure definition.

At least one second message part may be subjected to encrypting or integrity protecting; and at least one second message part may be subjected to modification tracking with integrity protecting.

One first message part may be divided into more than one different second message parts. The second message parts may each be subjected to at least one of: encrypting; integrity protecting; or modification tracking with integrity protecting. One or more sub-features of one feature may be subjected to different protection than the feature itself, wherein the protection is selected from a group consisting of: encrypting; integrity protecting; or modification tracking with integrity protecting.

The second message may be subsequently modifiable by one or more intermediate nodes. The second message may be subsequently modifiable by one or more intermediate nodes up to an extent defined by the security structure definition.

The first network function may be an Access and Mobility Function, AMF. The second network function may be an Authentication Server Function, AUSF.

According to a second example aspect, there is provided a method comprising:

receiving by a security edge proxy a first message that has been sent by a first network function and addressed to a second network function;

the first message comprising a plurality of first message parts comprising: a request line or a response line; at least one header; and payload;

obtaining a security structure definition that defines a required security measure for each of the features and sub-features;

forming second message parts from the features and optional sub-features of the first message parts;

applying, according to the security structure definition, encrypting; integrity protecting; or modification tracking with integrity protecting;

forming a second message that contains the second message parts; and sending the second message towards the second network function.

According to a third example aspect, there is provided an intermediate node comprising:

a communication circuitry configured to receive a second message comprising a plurality of second message parts, originating from a security edge proxy and addressed to a second network function;

the second message parts each including one or more features and optional sub-features;

a processor configured to cause:

obtaining a security policy for the intermediate node; and a security structure definition that defines a required security measure for each of the features and sub-features;

checking if both a) the node has a need to change a given feature or sub-feature and b) said given message part is modifiable according to the security structure definition and the security policy, and if both conditions were met, then modifying said given feature of sub-feature with evidence of identity of the node and change made; and forwarding the second message towards the second network function.

The security structure definition may be obtained by reading from a memory. Alternatively, the security structure definition may be obtained by receiving from another entity. A portion of the security structure definition may be encoded to computer program code. The portion of the security structure definition encoded to computer program code may be loaded from a memory together with the program code.

The modifying of said given message part may be performed by adding a cryptographically verified record in an array of modifications within the second message.

The modifying of said given message part may be performed differentially by expressing a change.

The modifying of said given message part may be performed by changing the second message and recording an indication of how the second message was changed.

According to a fourth example aspect, there is provided a method in a node, comprising:

receiving a second message comprising a plurality of second message parts, originating from a security edge proxy and addressed to a second network function;

the second message parts each including one or more features and optional sub-features;

obtaining a security policy for the intermediate node; and a security structure definition that defines security measure requirements for each of the features and sub-features;

checking if both a) the node has a need to change a given message part and b) said given message part is modifiable according to the security structure definition and the security policy, and if both conditions were met, then modifying said given feature of sub-feature with evidence of identity of the node and change made; and forwarding the second message towards the second network function.

According to a fifth example aspect, there is provided an apparatus;

wherein the apparatus is a security edge proxy comprising:

an input for receiving a second message comprising a plurality of second message parts and that has been transformed from a first message and modified and forwarded by at least one intermediate node;

wherein the first message comprises a plurality of first message parts comprising: a request line or a response line; at least one header; and payload, each including one or more features and optional sub-features;

the second message parts each including one or more of the features and sub-features;

the apparatus further comprising a processor configured to cause:

obtaining a security policy for the intermediate nodes; and a security structure definition that defines a required security measure for each of the features and sub-features of second message parts of the second message;

determining how the second message differs from the first message and which changes made by each individual one of the intermediate nodes over the first message are acceptable using the security structure definition and the security policy for the intermediate nodes;

if some changes of the intermediate nodes were not found acceptable, rejecting the second message or performing:

forming a third message from the second message by rejecting other changes of the intermediate nodes than those that were found acceptable; and forwarding the third message to the second network function.

The third message may comprise the first message and any changes made to the first message except those that were made by the intermediate nodes and not found acceptable.

The determining how the second message differs from the first message may comprise determining whether the second message does differ from the first message.

According to a sixth example aspect, there is provided a method comprising:

receiving by a security edge proxy a second message comprising a plurality of second message parts and that has been transformed from a first message and modified and forwarded by at least one intermediate node;

wherein the first message comprises a plurality of first message parts comprising: a request line or a response line; at least one header; and payload, each including one or more features and optional sub-features;

the second message parts each including one or more of the features and sub-features;

obtaining a security policy for the intermediate nodes; and a security structure definition that defines a required security measure for each of the features and sub-features;

determining how the second message differs from the first message and which changes made by each individual one of the intermediate nodes over the first message are acceptable using the security structure definition and the security policy for the intermediate nodes;

if some changes of the intermediate nodes were not found acceptable, rejecting the second message or performing:

forming a third message from the second message by rejecting other changes of the intermediate nodes than those that were found acceptable; and forwarding the third message to the second network function.

According to a seventh example aspect, there is provided a computer program comprising computer executable program code configured to execute a method of any preceding example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to an eighth example aspect, there is provided a system comprising two or more of the following: the apparatus of the first example aspect; the intermediate node of the third example aspect; the apparatus of the fifth example aspect; and the computer program of the seventh example aspect; and the memory medium.

Different non-binding example aspects and embodiments have been illustrated in the foregoing. The embodiments in the foregoing are used merely to explain selected aspects or steps that may be utilized in implementations. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

An example embodiment and its potential advantages are understood by referring to FIGS. 1 through 8 of the drawings. In this document, like reference signs denote like parts or steps.

Figure 1:
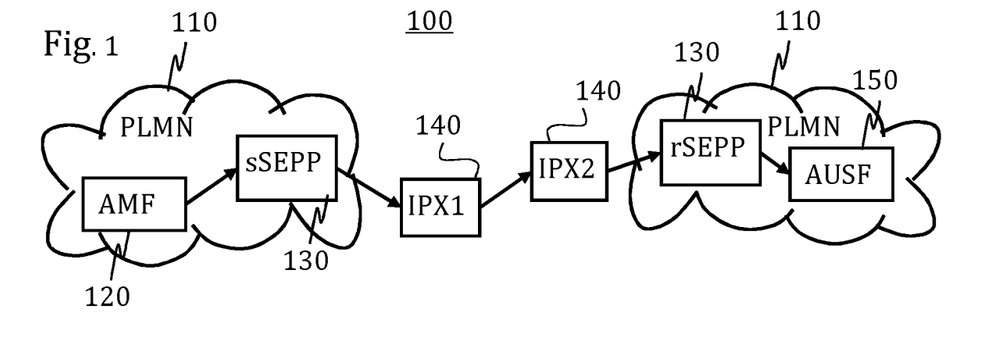
FIG. 1 shows an architectural drawing of a system of an example embodiment.

FIG. 1 shows an architectural drawing of a system 100 of an example embodiment. FIG. 1 shows two PLMNs 110 equipped with a first Network Function 120 that in a sending case is, for example, an Access and Mobility Function (AMF). The PLMNs each further comprise a Security Edge Proxy (SEPP) 130. The SEPP of one PLMN acts as a sending SEPP 130 or sSEPP and another one as a receiving SEPP 130 or rSEPP for one message. The SEPP 130 is a network node at the boundary of an operator's network that receives a message such as an HTTP request or HTTP response from the network function AMF 120, applies protection for sending, and forwards the reformatted message through a chain of intermediate nodes such as IP eXchanges (IPX) 140 towards the rSEPP 130.

The rSEPP 130 receives a re-arranged and potentially modified protocol message from an intermediate node 130, re-assembles the message (e.g. HTTP request or response), and forwards the re-assembled message towards a second network function within its operator's network, e.g. an Authentication Server Function (AUSF) 150. The re-assembled message can alternatively be sent towards any other network function of the second network.

The intermediate node 140 or intermediary in short is, for example, a network node outside the operator's network that receives (directly or indirectly via other intermediaries) a reformatted message from the sSEPP 130, that may selectively modify the message according to the method for integrity protection with modification tracking, and that forwards the message towards another intermediary 140 or to the rSEPP 130.

Notice that the rSEPP 130 and sSEPP 130 may simultaneously act in both roles and that their structure may also be similar or identical, so both are denoted by same reference sign 130 while their role in delivery of a particular message is identified by use of the prefix "s" or "r" indicating whether they send or receive.

Data re-arrangement according to an example embodiment is next described. Assuming the message being an HTTP message that complies to HTTP protocol, the message includes three protocol elements:

A) a request line or a response line. The request line consists, for example, of 1) an HTTP method, 2) a request URI that may contain an authority (host and port), a hierarchical part, a query and a fragment part, and 3) a protocol identifier. The response line consists, for example, of a protocol identifier, a status code and a status text.

B) A set of HTTP headers

C) An optional payload body, for instance formatted as JSON or XML

All three parts may contain parameters of a higher-layer protocol that is carried over HTTP, which may be of interest to the intermediaries for reading and/or modifying them.

For each part, the data are re-arranged (for instance by defining a suitable intermediate JSON structure or JSON structures) such that one of the three protection methods defined in the next part can be applied to them (or to desired one or more sub-parts such as given attributes or nested attributes).

Methods of protection of different parts can be freely chosen, while following standardized methods are disclosed for example:

Encryption (enc): The part(s) of the intermediate data structure that require(s) e2e confidentiality protection is/are encrypted, e.g. using JSON Web Encryption (JWE) of RFC 7516;

E2E Integrity Protection (e2eProt): The part(s) of the intermediate data structure that require(s) e2e protection from modification by the intermediaries is/are signed, e.g. using JSON Web Signature (JWS) of RFC 7520;

Integrity Protection with Modification Tracking (modE2eProt): The part(s) of the intermediate data structure that are allowed to be modified (selectively) by the intermediaries is/are protected by a method described in the next part.

The integrity protection with modification tracking is configured to store the original data structure together with a signature of the sSEPP 130, and to additionally store the modification chain, one entry per intermediary, and sign each modification chain entry with the signature of the intermediary that has performed the modification. This way, the rSEPP 130 can subsequently determine separately for each change whether it was performed by an authorized intermediary 140 and whether it complies with the policy for that intermediary.

In an embodiment, the original data structure is dynamic such that each intermediate node 140 adds a new field to a modified item so forming a growing array.

Figure 2:
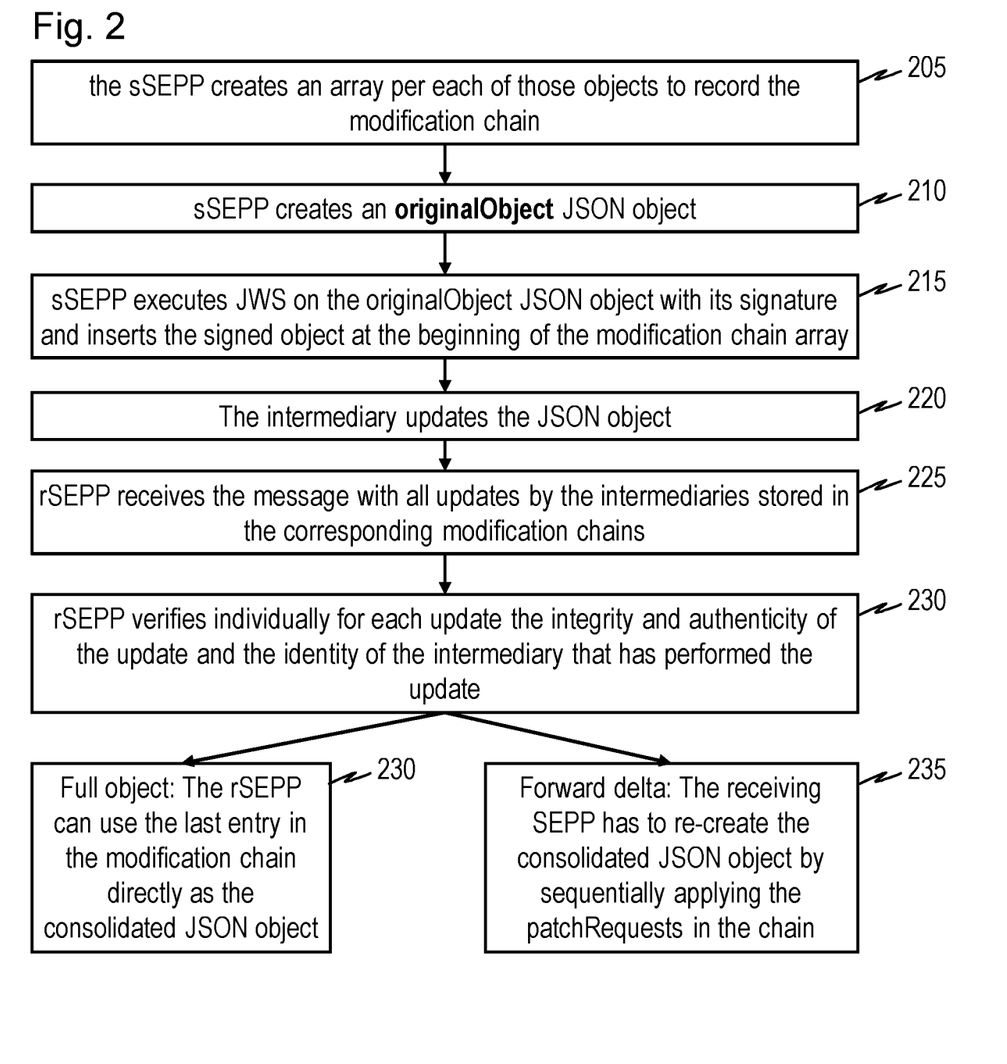
FIG. 2 shows a flow chart of a process of an example embodiment.

FIG. 2 shows a flow chart of a process of an example embodiment. The process is performed on the JSON objects that are protected with the modE2eProt method, i.e. that require integrity protection but may also be modifiable by the intermediary 140.

1. For each JSON object that require integrity protection but may also be modifiable by the intermediary 140, a) the sSEPP 130 creates 205 an array per each of those JSON objects to record the modification chain. In beginning, the array may have depth of only one value.

b) the sSEPP 130 creates 210 an originalObject JSON object containing the following:

Full JSON object (unchanged received from first network function 120)

Identity: which uniquely identifies the sSEPP 130

Update order: Next available slot in the modification chain array (for the originalObject this will be the first slot in the modification chain)

c) The sSEPP 130 then executes 215 JWS on the originalObject JSON object with its signature and inserts the signed object at the beginning of the modification chain array.

2. The intermediary 140 updates 220 the JSON object. In this stage, the intermediary 140:

a) creates a patchRequest JSON object containing the following:

i. (A) full JSON object that includes the desired changes. To construct a full JSON object, the intermediary 140 modifies the last full JSON object in the modification chain; OR (B) just a forward delta that only records the modifications made by the intermediary 140.

ii. Identity, which uniquely identifies the intermediary 140 to the rSEPP 130.

iii. Update order: Next available slot in the modification chain array.

This is required to ensure that the order of updates cannot be tampered with.

b) the intermediary 140 then executes JWS on the patchRequest JSON object created above in 2.a with its signature and inserts it into the next available slot in the corresponding chain identified by 2.a.iii.

NOTE 1: In step 2.a.i, the full JSON object is created, for example, as follows: in case the patchRequest is a full JSON object, the full JSON object corresponds to the full JSON object in the patchRequest; otherwise, the full JSON object is constructed from applying the patchRequests in the modification chain in sequence to the originalObject.

NOTE 2: When patchRequest contains a forward delta, the syntax and semantic to capture the delta may be taken from RFC 7386—JSON Merge Patch or RFC 6902—JSON Patch. Another embodiment uses other means such as UNIX diff format.

NOTE 3: The "Update order" is computed by the intermediary 140, e.g., as follows: The intermediary 140 obtains the integrity protected value of the "Update order" in the previous instance of the patchRequest in the modification chain, or in the originalObject if no patchRequest exists, and increments it by one. The value thus obtained, is checked to verify that it aligns with the next empty slot in the modification chain array.

3. The rSEPP 130 receives 225 the message with all updates by the intermediaries stored in the corresponding modification chains.

4. The rSEPP 130 verifies 230 individually for each update the integrity and authenticity of the update and the identity of the intermediary 140 that has performed the update.

5. Depending on the method used in 2.a.i, the rSEPP 130 performs the following steps to obtain the consolidated JSON object and optionally check whether the modifications performed by the intermediaries were permitted by the policy:

a. 230 Full object: The rSEPP 130 can use the last entry in the modification chain directly as the consolidated JSON object. If the rSEPP 130 intends to apply policy to the changes (e.g. determine whether they are allowed), it has to determine what has been changed by comparing with previous versions of the JSON object in the chain. Policy could either be enforced end-to-end (in which case comparison of the last object in the chain is done against the first object in the chain) or hop-by-hop (in which case comparison needs to be done between subsequent versions in the chain, and the policy can differ by intermediary).

b. 235 Forward delta: The receiving SEPP 130 has to re-create the consolidated JSON object by sequentially applying the patchRequests in the chain. Applying policy hop-by-hop is straightforward, as the deltas are readily available. Applying policy end-to-end requires applying policy to all individual deltas, or by computing the cumulative delta by combining all forward deltas in the chain in sequence, and applying the end-to-end policy to that delta.

NOTE: steps 4 and 5 can be performed in any order.

Figure 3:
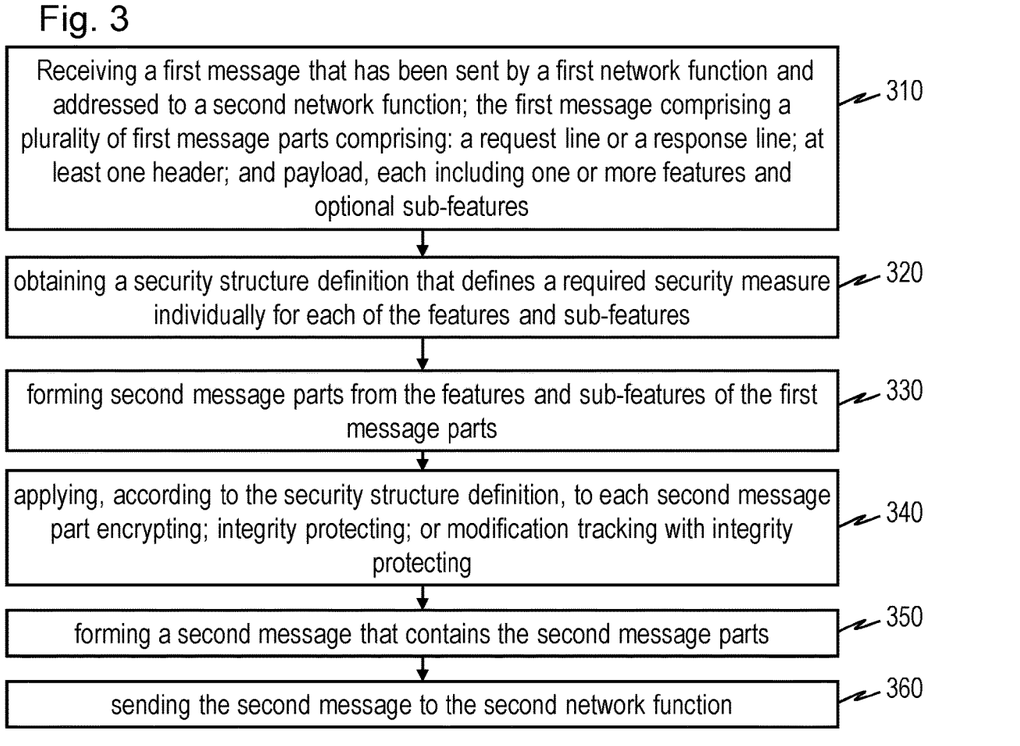
FIG. 3 shows a flow chart of a process of an example embodiment in an sending Security Edge Proxy.

FIG. 3 shows a flow chart of a process of an example embodiment in an sSEPP 130, comprising:

Receiving 310 a first message that has been sent by a first network function and addressed to a second network function.

the first message comprising a plurality of first message parts comprising: a request line or a response line; at least one header; and payload, each including one or more features and optional sub-features;

obtaining 320 a security structure definition that defines a required security measure for each of the features and sub-features. The security structure definition is formed in an embodiment by the sSEPP. In another embodiment, the security structure definition is received from another entity. In an embodiment, the security structure definition is common for given type of messages or network functions. In an embodiment, the security structure definition is at least partially encoded to computer program code and loaded with the program code.

FIG. 3 further shows:

forming 330 second message parts from the features and sub-features of the first message parts;

applying 340, according to the security structure definition, to each second message part encrypting; integrity protecting; or modification tracking with integrity protecting;

forming 350 a second message that contains the second message parts; and sending 360 the second message towards the second network function.

In an example embodiment, the forming of the second message parts from the features and sub-features of the first message parts is performed according to the security structure definition.

The forming of the second message parts comprises in an example embodiment modifying the content of the first message parts. The modifying of the content of the first message parts may effectively modify the first message. This modifying is performed in an example embodiment before the applying of the encrypting; integrity protecting; or modification tracking with integrity protecting. In an example embodiment, the sSEPP modifies the second message corresponding to the intermediate nodes 140 (as will be described in the following). The sSEPP may first form and cryptographically protect the second message and then perform modifications and cryptographically protect them. The cryptographic protecting may comprise using integrity protecting or modification tracking with integrity protecting.

Figure 4:
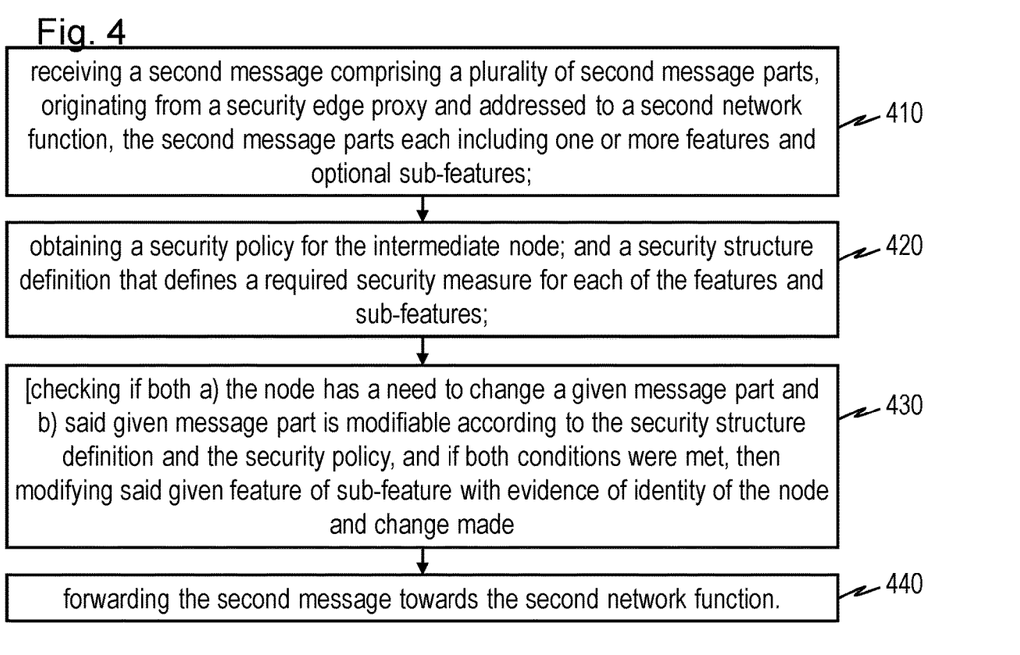
FIG. 4 shows a flow chart of a process of an example embodiment in an intermediate node.

FIG. 4 shows a flow chart of a process of an example embodiment in an intermediate node 140, comprising:

receiving 410 a second message comprising a plurality of second message parts, originating from a security edge proxy and addressed to a second network function; the second message parts each including one or more features and optional sub-features;

obtaining 420 a security policy for the intermediate node; and a security structure definition that defines a required security measure for each of the features and sub-features;

checking 430 if both a) the node 140 has a need to change a given message part and b) said given message part is modifiable according to the security structure definition and the security policy, and if both conditions were met, then modifying said given feature of sub-feature with evidence of identity of the node 140 and change made; and forwarding 440 the second message towards the second network function.

Figure 5:
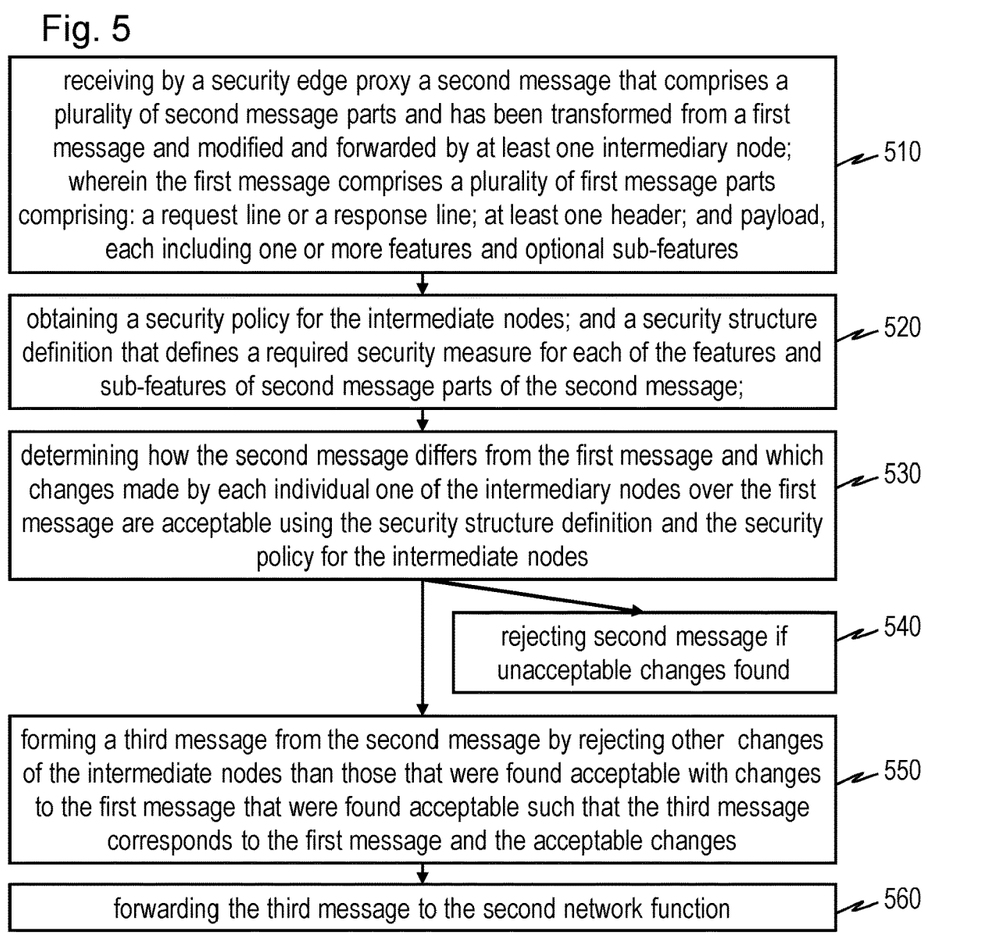
FIG. 5 shows a flow chart of a process an example embodiment in a receiving Security Edge Proxy.

FIG. 5 shows a flow chart of a process an example embodiment in an rSEPP 130, comprising:

receiving 510 by a security edge proxy a second message that comprises a plurality of second message parts and has been transformed from a first message and modified and forwarded by at least one intermediate node 140;

wherein the first message comprises a plurality of first message parts comprising: a request line or a response line; at least one header; and payload, each including one or more features and optional sub-features;

the second message parts each including one or more of the features and sub-features;

obtaining 520 a security policy for the intermediate nodes; and a security structure definition that defines a required security measure for each of the features and sub-features of second message parts of the second message;

determining 530 how the second message differs from the first message and which changes made by each individual one of the intermediate nodes 140 over the first message are acceptable using the security structure definition and the security policy for the intermediate nodes;

if some changes of the intermediate nodes were not found acceptable, rejecting 540 the second message or performing:

forming 550 a third message from the second message by rejecting other changes of the intermediate nodes than those that were found acceptable; and forwarding 560 the third message to the second network function.

In an example embodiment, only one of rejecting the second message or rejecting some changes is provided for.

A use case is next presented for exemplifying some example embodiments:

a. The sSEPP 130 receives the HTTP message from the first network function 120 and does the following:

a.1) If the message is an HTTP request message:

The sSEPP 130 shall encapsulate the HTTP request line into a JSON object called RequestLine containing an attribute each for the method, the optional authority part of the URI, the remaining parts of the URI and the protocol of the request. If necessary, e.g. for routing, the SEPP 130 integrity-protects, e.g., the authority part using JWS and encrypts the remaining parts of the request line with JWE; otherwise, the SEPP 130 encrypts the complete contents of RequestLine with JWE.

NOTE 1: Deeper structuring that allows for breaking out individual parameters from the hierarchy part/query part of the URI, and enables selective protection of those parts, can be implemented using standard or proprietary methods.

NOTE 2: We also cover a variant where the authority and the rest of the request line are represented in different JSON object (for example, if the granularity of protection is a root JSON object).

NOTE 3: in an example embodiment, integrity protection with modification tracking is provided for the request line in an embodiment.

a.2) If the message is an HTTP response message:

An HTTP response line is included in a ResponseLine object that contains an attribute for each of the HTTP version, the status code and the status message. The ResponseLine is integrity-protected with JWS.

In some embodiments, other methods (encrypt, integrity protection with modification tracking) are applied to some or all parts (e.g. attributes) of the response line.

b) The sSEPP 130 shall encapsulate all the headers of the request into a JSON object (map) called HttpHeaders and execute the procedure defined with reference to FIG. 2 on it (integrity protection with modification tracking).

c) The sSEPP 130 shall include the payload body of the request in a JSON object called Payload. This contains three JSON objects:

encryptedPayload containing all JSON objects that require e2e confidentiality protection e2eIntegrityProtectedPayload containing all JSON objects that are e2e protected and not allowed to be modified by the intermediaries modifiableIntegrityProtectedPayload containing all JSON objects that are protected by sSEPP 130 but are also allowed to be modified by authorized intermediaries Different first message parts (e.g. a request line or a response line; at least one header; and payload) may be included in the different JSON objects for the different protection types (encryption, integrity protection and modification tracking with integrity protection). In some cases (e.g. in case of some messages and/or some originating network functions), different sub-parts or attributes of one message part are included in different ones of the JSON objects for respective different protection. Each of the objects, e.g. of the JSON objects, may also be embodiments of the second message parts.

NOTE: There may be only a loose relationship between the granularity of the JSON objects stored as being part of the modifiableIntegrityProtectedPayload and the actually allowed modification which might have finer granularity.

Additional binary payloads in multipart messages from the first network function are represented as separate binaryPayload objects.

2. The SEPP 130 executes encryption operation (enc) to encrypt the complete encryptedPayload (and, if applicable, binaryPayload) JSON object.

NOTE: This assumes that an object as a whole is protected completely. Selective encryption of a nested object is also possible.

3. The sSEPP 130 executes e2eProt operation to integrity protect the complete e2eIntegrityProtectedPayload object.

4. For those JSON objects inside modifiableIntegrityProtectedPayload that require integrity protection but may also be modifiable by an intermediary 140, the procedure defined with reference to FIG. 2 is executed.

5. If the validation of the integrity and authenticity of the updates, and their checking against the policy by the rSEPP 130 were successful, the rSEPP 130 re-assembles the HTTP Request or HTTP Response from the RequestLine or ResponseLine information, the HttpHeaders information, the consolidated JSON object and the remaining E2E protected or encrypted parts of the payload, and forwards it to the second network function 150.

This is an e2e protocol between two SEPP 130s. Thus, e2e verification of the message, including authenticity of the intermediaries and validity of their updates, are performed by the rSEPP 130.

Assumptions:

1. Each IPX provider is assumed to be the intermediary 140 through which the message travels on its way from the sSEPP 130 to the rSEPP 130.

2. IPX provider's public key or shared symmetric key to be available with the entities that are required to verify the signature or the sender.

3. IPX provider's agreed "scope of modification" is shared with the rSEPP 130, so that the rSEPP 130 can verify if the fields changed by the intermediary 140 are within its agreed scope.

Pre-requisite:

1. SEPP 130 has authorized the intermediaries that are directly under the operator's control through an agreement, for e.g., and obtained the required public key or the established shared symmetric key needed for signature/mac verification. Each SEPP 130 authorizes its own IPX provider, and then shares the required public key/symmetric key with the other SEPPs 130.

2. Both SEPPs 130 are aware of how each of the IEs is protected—e2e confidentiality protected (enc), e2e integrity protected (e2eProt), e2e integrity protected but modifiable by authorized intermediaries (modE2eProt).

For the sSEPP 130, this may be defined e.g. by configuration. The rSEPP 130 can learn the applied protection from the structure of the message, and is e.g. configured with policies that define the permitted modifications and authorized intermediaries.

Figure 6:
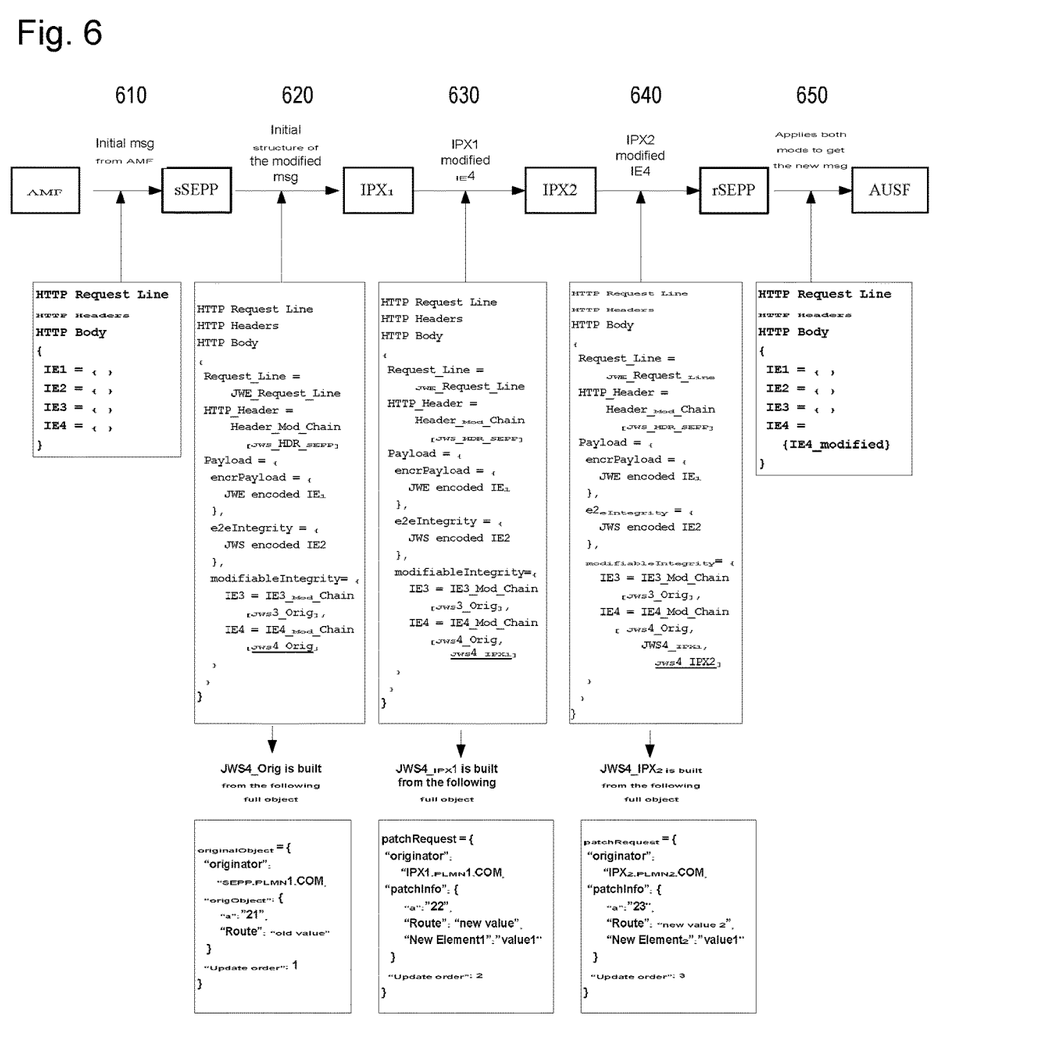
FIG. 6 shows an example of request message travel.

FIG. 6 shows an example of request message travel. FIG. 6 illustrates how the original HTTP request message (i.e. first message) is transformed (to a second message) as it traverses in this example from an Access and Mobility Function (AMF) in the operator network via the sSEPP 130 at the edge and over an N32 interface through two IPX providers which modify a given Information element (IE4 is used here as an example) in the message. The rSEPP 130 verifies the received (second) message, and reassembles the HTTP request message with the modified IE4 (to a third message, which may be same or different by content than the second depending e.g. on whether all modifications were acceptable), before forwarding (third message) it to the second network function 150 (e.g. AUSF).

610. rSEPP 130 receives the first or initial message from the first network function 120. In this example:

IE1 needs confidentiality protection
IE2 needs e2e integrity protection
IE3 needs integrity protection with modification tracking
IE4 needs integrity protection with modification tracking
620. sSEPP 130 modified message Attributes or information elements IE3 and IE4 are integrity protected but may also be modified by the intermediary 140. Hence sSEPP 130 generates arrays (IE3_Mod_Chain and IE4_Mod_Chain) to store possible updates by the intermediaries.

Each JWS object created by sSEPP 130 contains: protected Header, protected payload, signature. In this context, the header and payload naturally refer to parts of the JWS object.

Header: algorithm used in generating the signature
Payload: original JSON object
Signature: of Header & Payload
630. IPX 1 modifies IE4

IPX 1 IE4. It creates a patch request, protects it with JWS and inserts it into IE4_Mod_Chain. The example below illustrates the use of the "JSON Merge Patch" format" to capture the forward delta. In the patchRequest object, values of "a" and "Route" are modified to 22 and value1 respectively by IPX 1. In addition, a new element is added called "New Element 1". The patchRequest is used as payload by the intermediary 140 when creating the JWS object for addition to the IE4_Mod_Chain.

640. IPX 2 modifies IE4

IPX 2 updates IE4 including addition of a new element called "New Element 2", integrity protects it with JWS and adds to IE4_Mod_Chain.

650. rSEPP 130 reassembles the message and sends it to the second network function 150.

Once rSEPP 130 individually verifies the updates and its validity (process of FIG. 2, step 4), the rSEPP 130 reassembles the HTTP Request or HTTP Response from the Request_Line or Response_Line information, the HTTP_Header information, the consolidated JSON object and the remaining E2E protected or encrypted parts of the payload, and forwards it to the second network function 150.

Figure 7:
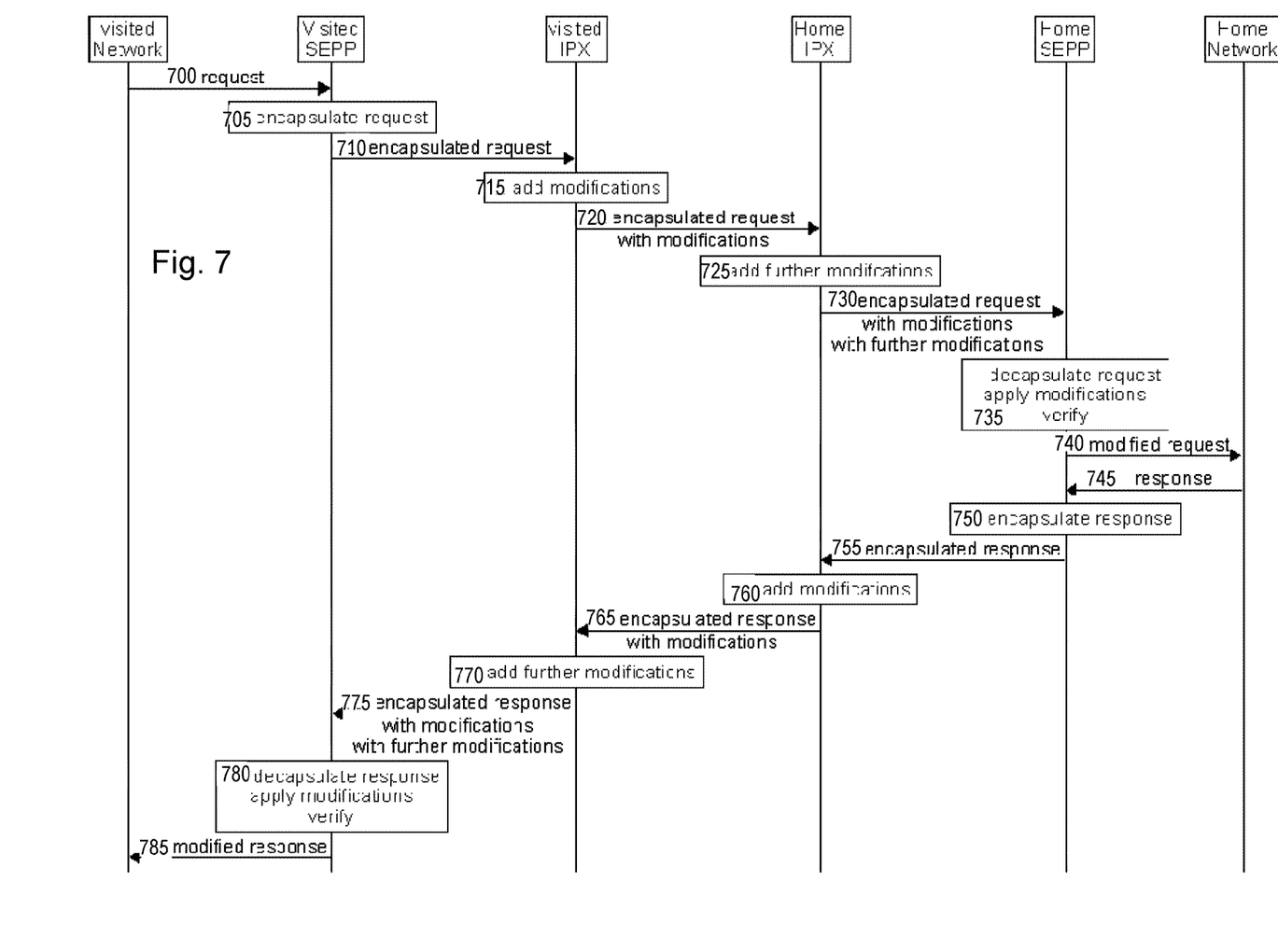
FIG. 7 shows an example message flow across N32 based on integrity protection with modification tracking based on Forward Delta.

FIG. 7 shows an example message flow across N32 based on integrity protection with modification tracking based on Forward Delta In steps 700 to 740, the visited SEPP 130 (vSEPP) acts as a sending SEPP 130 (sSEPP) and the home SEPP 130 (hSEPP) acts as the receiving SEPP 130 (rSEPP), whereas in steps 745 to 785, the roles are reversed.

700. The vSEPP 130 receives an HTTP request (first message).

705. The vSEPP 130 shall encapsulate the HTTP request line into a JSON object called Request_Line containing an element each for the method, the URI, and the protocol of the request.

The vSEPP 130 shall encapsulate the header of the request into a JSON array called HTTP_Header, with each value in the array a JWS object for the header in the original request. The payload for the JWS object includes all headers in the original request.

For those JSON objects that require e2e confidentiality protection between two SEPPs, the vSEPP 130 executes JWE to encrypt the object. JWE object replaces the original object in the second message.

For those JSON objects that require e2e integrity protection, vSEPP 130 executes JWS to integrity protect the object. JWS object replaces the original object in the second message.

For those JSON objects that require integrity protection but may also be modifiable by the intermediary 140, the vSEPP 130 creates to the second message an array per each of those JSON objects. For each of those identified objects, the vSEPP 130 shall integrity protect the original object using JWS, and insert the resulting JWS object as the first element of the corresponding array.

710. The vSEPP 130 shall use HTTP POST to send the protected request or second message towards the first intermediary 140 (visited network's IPX provider).

715. The first intermediary 140 (e.g. visited network's IPX provider) determines which IEs require updates. For each identified IE, it does the following:

It creates a Patch Request JSON object that includes all its desired changes for the IE. The syntax and semantic for this object may be taken from RFC 7386—JSON Merge Patch.

It includes its identity in the Patch Request along with the next available slot in the patch array that it'll use to insert the Patch Request.

The intermediary 140 then executes JWS on the Patch request JSON object and inserts into the next available slot in the corresponding array.

720. The first intermediary 140 sends the encapsulated request (once modified second message) to the second intermediary 140 (home network's IPX) as in step 710.

725. The second intermediary 140 repeats the steps as in step 715.

730. The second intermediary 140 sends the encapsulated request (twice modified second message) to the hSEPP 130 as in step 710.

Note: The behaviour of the intermediate nodes is not normative, but the hSEPP 130 assumes that behaviour for processing the resulting request.

735. The hSEPP 130 receives the second message with all updates by the intermediate nodes 140 stored in corresponding arrays but not applied yet to the original value.

The hSEPP 130 verifies integrity and authenticity of each update individually. The hSEPP 130 also checks whether the modifications performed by the intermediate nodes were permitted by the policy.

The hSEPP 130 then applies patches in order and creates an HTTP Request.

740. The hSEPP 130 sends the HTTP Request resulting from step 735 to the home network's second network function 150.

Steps 745 to 785: These steps shall be analogous to steps 700 to 740, but treating the HTTP response like the HTTP request.

Figure 8:
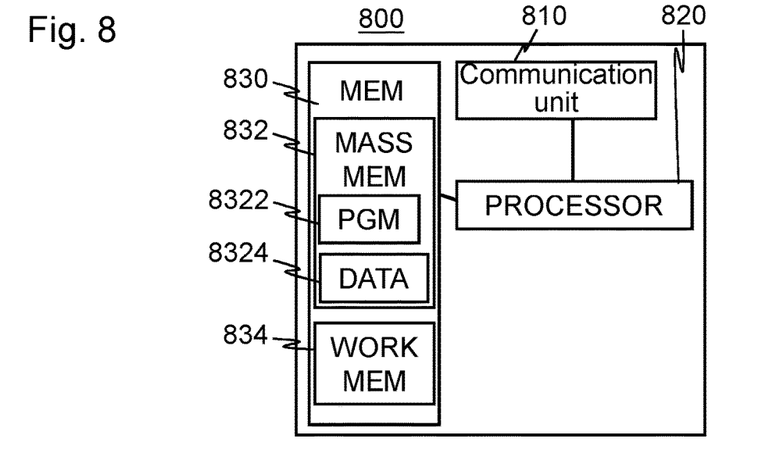
FIG. 8 shows a block diagram of an apparatus according to an embodiment.

FIG. 8 shows a block diagram of an apparatus 800 according to an embodiment. The apparatus may be used as a first network function 120, a SEPP 130, an intermediate node 140, or a second network function 150.

The apparatus 800 comprises a memory 830 including a persistent memory 832 that comprises computer program code 8322 and data 8324, and work memory 834. The apparatus 800 further comprises a processor 820 for controlling the operation of the apparatus 800 using the computer program code 8322, a communication circuitry 810 for communicating with other entities. The communication circuitry 810 comprises, for example, a local area network (LAN) port; a wireless local area network (WLAN) circuitry; Bluetooth circuitry; cellular data communication circuitry; or satellite data communication circuitry. The processor 820 comprises, for example, any one or more of: a master control unit (MCU); a microprocessor; a digital signal processor (DSP); an application specific integrated circuit (ASIC); a field programmable gate array; and a microcontroller.

As used in this application, the term "circuitry" may refer to one or more or all of the following:
(a) hardware-only circuit implementations (such as implementations in only analogue and/or digital circuitry) and;
(b) combinations of hardware circuits and software, such as (as applicable):
  (i) a combination of analogue and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that inter-network network function messaging can be flexibly protected. Another technical effect of one or more of the example embodiments disclosed herein is that configuration of a 5G network can be dynamically changed even from one network function message to another depending on, for example, the network function in question and/or intermediate nodes needed for message traversal to destination network function. Yet another technical effect of one or more of the example embodiments disclosed herein is that the receiving the intermediate nodes need not be configured to be capable of validating outputs of other intermediate nodes or of the sSEPP. The validating of the first message content transferred by the intermediate nodes may be performed by the rSEPP independently of the intermediate nodes.

Embodiments may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined. Moreover, where reference is made to one component or entity, its functions may be distributed to or more sub-units, e.g. instead of one processor, a plurality of processors may perform some, though not necessarily all, operations of one entity.

Although various aspects are set out in the independent claims, other aspects comprise other combinations of features from the described embodiments and/or the dependent claims with the features of the independent claims, and not solely the combinations explicitly set out in the claims.

It is also noted herein that while the foregoing describes example embodiments, these descriptions should not be viewed in a limiting sense. Rather, there are several variations and modifications which may be made without departing from the scope as defined in the appended claims.

The invention claimed is:

1. An apparatus comprising:
   at least one non-transitory memory storing instructions, that when executed by at least one processor, cause the apparatus to:
   receive a first message that has been sent by a first network function and addressed to a second network function;
   the first message comprising a plurality of first message parts comprising: a request line, a response line, at least one header, and a payload, wherein the at least one header and the payload are each including one or more features and optional sub-features;
   obtain a security policy and a security structure definition that defines a required security measure for each of the feature and optional sub-feature;
   form second message parts from the features and sub-features of the first message parts;
   apply the security structure definition to the second message parts by encrypting; integrity protecting; or modification tracking with integrity protecting each second message part;
   determine if according to the security structure definition and the security policy a first condition based on a need to change given features or sub-features of the second message parts, and a second condition based on said given features or sub-features of the second message parts being modifiable is met;
   based on determining the first condition and the second condition are both met, modify one or more of the features or sub-features of the second message parts with evidence of identity of the node and change made after the applying of the encrypting, integrity protecting, or modification tracking with integrity protecting;
   form a second message that contains the second message parts; and
   send the second message towards the second network function, wherein the apparatus comprises a security edge proxy.

2. The apparatus of claim 1, wherein the apparatus is further caused to perform the forming of the second message parts from the features and optional sub-features of the first message parts according to the security structure definition.

3. The apparatus of claim 1, wherein the second message is subsequently modifiable up to an extent defined by the security structure definition.

4. The apparatus of claim 1, wherein the forming of the second message parts comprises modifying the content of the first message parts.

5. The apparatus of claim 1, wherein the apparatus is further caused to perform:
   storing a modification chain, one entry per intermediary apparatus, and signing each modification chain entry with the signature of the intermediary apparatus that has performed the modification,
   wherein determining if according to the security structure definition and the security policy the first condition and the second condition are both met is applying the security policy by comparing previous versions with one of end-to-end comparison of a last object in a modification chain entry against a first object in the modification chain entry, or hop-by-hop between subsequent versions in a modification chain entry.

6. The apparatus of claim 5, wherein the modifying is performed in the second message before the applying of the encrypting; integrity protecting; or modification tracking with integrity protecting.

7. An intermediate node comprising
   at least one processor; and
   at least one non-transitory memory storing instructions, that when executed by the at least one processor, cause the intermediate node to:
   receive a second message comprising a plurality of second message parts, originating from a security edge proxy and addressed to a second network function;
   the second message parts each including one or more features and optional sub-features;
   obtain a security policy and a security structure definition for the intermediate node,
   wherein the security structure definition defines a required security measure for each of the features and sub-features;
   determine if according to the security structure definition and the security policy a first condition based on a need to change given features or sub-features of the second message parts, and a second condition based on said given features or sub-features of the second message parts being modifiable is met;
   based on determining the first condition and the second condition are both met, modify one or more of the features or sub-features of the second message parts with evidence of identity of the node and change made after the applying of the encrypting, integrity protecting, or modification tracking with integrity protecting; and
   forward the second message towards the second network function.

8. The intermediate node of claim 7, wherein the modifying of said given message part is performed by adding a cryptographically verified record in an array of modifications within the second message.

9. The intermediate node of claim 7, wherein the modifying of said given message part is performed by changing the second message and recording an indication of how the second message was changed.

10. An apparatus; wherein the apparatus is a security edge proxy comprising at least one processor; and at least one non-transitory memory storing instructions, that when executed by the at least one processor, cause the apparatus to at least:
    receive a second message that comprises a plurality of second message parts having been transformed from a first message and modified and forwarded by at least one intermediate node;
    wherein the first message comprises a plurality of first message parts comprising: a request line or a response line;
    at least one header, and payload, wherein the at least one header and the payload are each including one or more features and optional sub-features, and wherein the second message parts each including one or more of the features and sub-features;
    obtain a security policy for the intermediate nodes, and a security structure definition that defines a required security measure for each of the features and sub-features of second message parts of the second message;
    determine if according to the security structure definition and the security policy a first condition based on a need to change given features or sub-features of the second message parts, and a second condition based on said given features or sub-features of the second message parts being modifiable is met;

based on both the first condition and the second condition being net, identifying at least some of the changes are acceptable using the security structure definition and the security policy for the intermediate nodes and forward the second message to the second network function; or if some changes of the intermediate nodes were not found acceptable, reject the second message or form a third message from the second message by rejecting other changes of the intermediate nodes than those that were found acceptable, and forward the third message to the second network function.

11. The apparatus of claim 10, wherein the determining how the second message differs from the first message comprises determining whether the second message does differ from the first message.

12. The apparatus of claim 10, wherein the determining whether the changes were found acceptable is performed for each intermediate node one by one based on the second message received by the apparatus.

13. A method comprising:
receiving by a security edge proxy a second message that comprises a plurality of second message parts and has been transformed from a first message and modified and forwarded by at least one intermediate node;
wherein the first message comprises a plurality of first message parts comprising:
a request line or a response line;
at least one header; and
payload, each including one or more features and optional sub-features; the second message parts each including one or more of the features and sub-features; obtaining a security policy for the intermediate nodes;
and a security structure definition that defines a required security measure for each of the features and sub-feature;
determining if according to the security structure definition and the security policy a first condition based on a need to change given features or sub-features of the second message parts, and a second condition based on said given features or sub-features of the second message parts being modifiable is met;
based on both the first condition and the second condition being net, identifying at least some of the changes are acceptable using the security structure definition and the security policy for the intermediate nodes and forward the second message to the second network function; or
if some changes of the intermediate nodes were not found acceptable, rejecting the second message or performing: forming a third message from the second message by rejecting other changes of the intermediate nodes than those that were found acceptable, and forwarding the third message to the second network function.

14. The method of claim 13, wherein the determining whether the changes were found acceptable is performed for each intermediate node one by one based on the second message received by the security edge proxy.

* * * * *